US011521145B2

(12) United States Patent
Megannon et al.

(10) Patent No.: US 11,521,145 B2
(45) Date of Patent: Dec. 6, 2022

(54) SYSTEM AND A METHOD FOR LIFE OF MINE PLANNING AND COST CONTROL

(71) Applicant: Mine RP Holdings (Pty) Limited, Centurion (ZA)

(72) Inventors: John Francis Megannon, Pretoria (ZA); Andries George Hendrik Loubser, Boskruin (ZA); Michael Woodhall, Blairgowrie (ZA)

(73) Assignee: MINERP IP INCORPORATED, Toronto (CA)

( * ) Notice: Subject to any disclaimer, the term of this patent is extended or adjusted under 35 U.S.C. 154(b) by 618 days.

(21) Appl. No.: 15/510,271

(22) PCT Filed: Sep. 10, 2015

(86) PCT No.: PCT/ZA2015/000058
§ 371 (c)(1),
(2) Date: Mar. 10, 2017

(87) PCT Pub. No.: WO2016/115579
PCT Pub. Date: Jul. 21, 2016

(65) Prior Publication Data
US 2018/0225604 A1    Aug. 9, 2018

(30) Foreign Application Priority Data
Sep. 10, 2014    (ZA) .................................. 2014/06820

(51) Int. Cl.
*G06Q 10/06*    (2012.01)
*G06Q 40/00*    (2012.01)
(Continued)

(52) U.S. Cl.
CPC ......... *G06Q 10/0633* (2013.01); *G06Q 10/06* (2013.01); *G06Q 10/087* (2013.01);
(Continued)

(58) Field of Classification Search
None
See application file for complete search history.

(56) References Cited

U.S. PATENT DOCUMENTS

| 7,191,097 B1 * | 3/2007 | Lee ........................ G06Q 10/06 702/183 |
| 2003/0139983 A1 * | 7/2003 | Spencer ............. G06Q 50/2057 705/28 |
| 2013/0262047 A1 * | 10/2013 | Darby, Jr. ............... G06F 17/50 703/1 |

FOREIGN PATENT DOCUMENTS

| CA | 2616419 A1 | 2/2007 |
| WO | WO 2009/119960 A1 | 10/2009 |

OTHER PUBLICATIONS

Ramco, Ramco Mine management; Aug. 2013. (Year: 2013).*
(Continued)

*Primary Examiner* — Cory W Eskridge
(74) *Attorney, Agent, or Firm* — Fay Sharpe LLP

(57) ABSTRACT

The invention relates to a computer-implemented system and method for planning and controlling multi-facet business activities over extended time periods, such as mining technical activities, during life of mine from concept and pre-feasibility assessment to closure in a mining operation for a mineral deposit, and enterprise support processes, such as costs, concurrently with such activities, in a direct substantially real-time manner. The system comprising a non-transitory computer readable storage medium storing computer-executable instructions, selected from at least one toolset, with mining technical activity, spatial and accounting rules, and at least one library, with company, mining technical and accounting codes and practices; a non-transitory computer accessible creator, for creating a work breakdown structure for a specific mining work place location and specific mining technical activities, represented at least (Continued)

partially in spatial geometries at a level of three-dimensional detail with preselected granularity in accordance with the planning and timeframe of the operation; a non-transitory computer accessible codifier, for codifying in accordance with the work breakdown structure a corresponding cost code structure of substantially equivalent granularity: a non-transitory computer accessible assimilator, for assimilating pre-selected, measurable parameters of the mining activities; a non-transitory computer accessible generator, for generating inventory transactions, reflecting the change in state and status of the mineral deposit; and a non-transitory computer accessible comparator, for comparing, In an ERP system to enable at least semi-continuous mine planning and operation, the use of resources and the costs of such use, during such activities at pre-selected detail and granularity. A non-transitory computer readable storage medium storing computer-implemented instructions, a master business schedule and a work break down structure with corresponding cost code structure is also provided.

15 Claims, 2 Drawing Sheets

(51) Int. Cl.
G06Q 10/08 (2012.01)
G06Q 50/02 (2012.01)
G06T 19/00 (2011.01)

(52) U.S. Cl.
CPC ......... *G06Q 10/0875* (2013.01); *G06Q 40/12* (2013.12); *G06Q 50/02* (2013.01); *G06T 19/00* (2013.01)

(56) References Cited

OTHER PUBLICATIONS

Mincom, Mincom Minescape, 2009 (Year: 2009).*
ABB White Paper, Next Level Mining, 2015 https://library.e.abb.com/public/5d588609dd1842de95c7f7312dbd24fe/Next_Level_Mining_White_%20paper.pdf (Year: 2015).*
Cms admin, Seamless Delivery, Aug. 25, 2009, Mining Technology https://www.mining-technology.com/features/feature61595/ (Year: 2009).*
Cms admin, Managing Mining Assets, Oct. 18, 2010, Mining Technology https://www.mining-technology.com/features/feature98831/ (Year: 2010).*
Matrix, Mine Planning & Software, Nov. 1, 2010, International Mining. https://im-mining.com/2010/11/01/mine-planning-software/ (Year: 2010).*
International Search Report for PCT Patent Application PCT/ZA2015/000058 dated Sep. 21, 2016.

* cited by examiner

SYSTEM AND A METHOD FOR LIFE OF MINE PLANNING AND COST CONTROL

CROSS-REFERENCE TO RELATED APPLICATIONS

This application is a 371 of PCT Application Serial No. PCT/ZA2015/000058, filed Sep. 10, 2015, which claims priority to South African Provisional Patent Application Serial No. 2014/06820, filed Sep. 10, 2014, the entirety of which is fully incorporated by reference herein.

FIELD OF THE INVENTION

The invention relates to a system and a method suitable for planning and controlling the costs of a multi-facet operation such as a mining operation for life of mine from concept and pre-feasibility assessment to closure.

BACKGROUND TO THE INVENTION

The concept of enterprise resource planning (ERP) and the incorporation of software and hardware related components and databases in support thereof is common practice in modern business society. The integration of core business processes, such as mining technical activities, preferably viewable in real-time, with the use of mining technical database management systems, and so-called ERP systems and their associated enterprise support processes, has enabled management to manage business resources such as equipment, raw materials and products, as well as the financial side thereof, including aspects such as orders, invoices and statements as well as expenses, including payrolls, payments and cash flow, in a holistic manner.

The ability and use of modern information technology, with its associated systems and processes, including componentry such as hardware, software, networks and databases, has become a material enabler and organization tool in ERP systems and processes and provides ever increasing components with a variety of functionalities, enabling the ERP systems and processes to integrate numerous off-the-shelf and proprietary systems and processes.

The ability and use of modern information technology, and its associated systems and processes, has similarly been applied successfully in project management methodologies with substantial benefit to project managers in multi-facet projects. One such methodology is a so-called work breakdown structure (WBS), which is typically used in project management to depict the task detail of a multi-facet operation. A work breakdown structure is commonly used to depict the tasks to reach an end goal, rather than means of reaching such goal, by reflecting detail of aspects of the end goal in preselected level of detail or granularity, rather than the method of achieving the goal.

Notwithstanding the capability of modern information technology and its associated systems and processes, with the various componentry, and the application thereof in business and project management, multi-facet technical cum financial immediate, short, medium and long term activities such as mining operations, which is include facets such as prospecting, conceptual studies, pre-feasibility studies, feasibility studies, mine development, mining operations and mine closure, are still hamstrung by the unavoidable and extensive yet disconnected planning and costing systems and processes, including componentry, used to conduct effective life of mine planning and cost control and the resultant inefficient mechanisms for allocation of costs to such activities during the planning and/or execution processes.

Unlike ERP systems, mining technical systems based management of mineral assets is typically performed within disparate, expert and usually proprietary mining technical systems, applications and solutions, typically implemented with the assistance of similarly proprietary application software, specifically designed to service the discrete needs of specific mining technical disciplines within mining operations. These systems and software typically provide a single expert discipline perspective of a mineral asset, without integration to and amalgamation of data from other separate mining technical disciplines related to the mineral asset. The non-integrated nature of the mining technical systems and services domain thus leaves significant areas, including mineral asset valuation, open to discrete interpretation by different technical and commercial disciplines, generally represented by a competent or qualified person within each, often disparate mining organization.

The lack of suitable systems and methods as well as the limited software integration internationally between mining technical systems and ERP systems are demonstrations of the technical complexity and disparate nature of the mining technical systems domain and the fact that there are limited processes where the activities from a mining technical perspective have a clear one-to-one relationship with a financial or commercial transaction.

The fact that modern mining companies only report on mineral resources and reserves once per annum is a further demonstration of the technical complexity and diversity as well as time consuming nature of the data collecting and assessment process, often comprising of manually integrating and interpreting the various technical data bundles from the mining technical disciplines and their supporting divisions that describe the state of mineral assets. Decisions regarding the application of capital to the mineral assets are accordingly impeded by the lack of integration between the financial and mining technical domains, as is the tracking and reporting against capital projects at a granular level.

For purposes of this specification, the term "ERP system" and cognate expressions shall be interpreted as to refer to systems capable of providing at least some degree of enterprise resource planning for a business activity, i.e. systems that provide at least partially integrated views of at least some core business processes, tracking at least some business resources and/or the status of at least some business commitments across at least some business departments, and/or facilitate information flow between at least some business functions of such business; the term "planning" and cognate expressions shall be interpreted as to take place during the concept, pre-feasibility assessment, feasibility assessment, mine development and mining operation stages up to and including mine closure; the term "mining company" and cognate expressions shall be interpreted as to refer to any legal or natural person, in a proprietary, contracting or other capacity, conducting as least part of a mining technical activity; the term "toolset" and cognate expressions shall be interpreted as to refer to a non-transitory computer implemented, set of predefined tools with particular functionality or computer application; the term "library" and cognate expressions shall be interpreted as to refer to a collection of similar compilations, stored for occasional application in a non-transitory computer-implemented system or by a computer-implemented method; and the term "planning and controlling" and cognate expressions shall be interpreted as to include assessing and/or optimizing future and/or already executed options of design and/or operation, such as for forensic purposes.

OBJECT OF THE INVENTION

It is therefore an object of the invention to provide a system and a method that is suitable for planning and controlling the activities and costs of multi-facet business activities over extended time periods such as a mining operation, for life of mine from concept and pre-feasibility assessment to closure in a direct, substantially real-time manner.

SUMMARY OF THE INVENTION

According to a first aspect of the invention there is provided a computer-implemented system for planning and controlling multi-facet business activities over extended time periods, such as mining technical activities, during life of mine from concept and pre-feasibility assessment to closure in a mining operation for a mineral deposit, and enterprise support processes, such as costs, concurrently with such activities, in a direct substantially real-time manner, the system comprising a non-transitory computer readable storage medium storing computer-executable instructions, selected from at least one toolset, with mining technical activity, spatial and accounting rules, and at least one library, with company, mining technical and accounting codes and practices; means for creating a work breakdown structure for a specific mining work place location and specific mining technical activities, represented at least partially in spatial geometries at a level of three-dimensional detail with preselected granularity in accordance with the planning and timeframe of the operation; means for codifying in accordance with the work breakdown structure a corresponding cost code structure of substantially equivalent granularity; means for assimilating pre-selected, measurable parameters of the mining activities; means for generating inventory transactions, reflecting the change in state and status of the mineral deposit; and means of comparing, in an ERP system to enable at least semi-continuous mine planning and operation, the use of resources and the costs of such use, during such activities at pre-selected detail and granularity.

The work breakdown structure for the mining work place location and the mining technical activities may be created for a specific mining method, based on a mine design template created to reflect a set of mining method specific rules that are founded on mine design considerations and the sequential nature of mining work, to enable the planning of such mining method, with particular outcomes in pre-selected parameters to provide so-called key performance indicators (KPI's) for associated mining technical activities, and the execution thereof to affect a change in the state and/or status of the workspace. The mining technical activities and, more specifically the resulting mining technical outcomes may be selected from a group comprising a ventilated, developed, supported, mapped, constructed, equipped, inspected, trammed, hoisted and stockpiled workspace.

The mining method specific rules may be created, assessed and implemented with due appreciation of the inherent risks characteristic of the specific mining method and operational guidelines of a specific mining company. The rules for each mining method as reflected within a specific design template is preferably constructed with the specific intent to generate and visualize three-dimensionally, the specific mining technical activities, their geometry and the sequence of such activities, enabling the assimilation of the relevant pre-selected, measurable parameters, including specific metrics such as meters, square meters, cubic meters, tons, mineral grades and mineral content for each mining operation, thereby creating the work breakdown structure for financial integration with the corresponding cost code structure of substantially equivalent granularity.

The system may have means for maintaining the granularity equivalency between the mining technical and the cost data at a pre-selected work breakdown structure level of detail according to specific policies and procedures (PnP) and codes of practice (COP) within a particular mining company and through at least semi-continuous master data governance within the mining company.

The means for creating the work breakdown structure is preferably capable of creating a programmable, comprehensive, repeatable design template that:
a. represents specific mining technical activities, geometry and sequence of activities; and dictates a corresponding cost code structure in the ERP cost allocation system to enable programmable planning and cost control of the use of resources for such activities at corresponding detail and granularity;
to accelerate the processes of planning and execution inclusive of relevant and appropriate costing.

The means for codifying the corresponding cost code structure is preferably capable of codifying, at least semi-continually, the cost code structure, for integration with the ERP system.

The means for assimilating the measurable parameters is preferably capable of assimilating, at least semi-continually, data that would provide the key performance indicators according to the pre-selected measurable parameters during the execution of mining technical activities to enable the tracking of change in state and status over time and, preferably, for determining, classifying and tracking such changes.

The means for generating inventory transactions is preferably capable of, at least semi-continually, receiving the changes in state and status of the mineral deposit being mined; translating such changes into inventory and stock items that are manageable within an inventory management system; and generating inventory management system transactions, based on such state and/or status changes of the corresponding mineral resources and reserves, substantially as disclosed in PCT Patent Application PCT/ZA2014/000036.

The means for comparing the use of resources and the costs of such use is preferably capable of comparing, in an at least partially-integrated fashion and accordance with the pre-selected policies and procedures and the codes of practice within the particular mining company, and master data governance, mining technical data and cost control data during the planning, exercising and costing of mine technical activities, including core and support mining technical activities, allowing preferably for functionality such as:
  issuance of a process works order, as an equivalent to a mining instruction, a survey measuring list, or a short term operational plan of activities;
  issuance of pro-forma inventory movement transactions, as daily bookings of mining activities;
  issuance of a purchase order, for purchasing of items, such as required according to a pre-setup bill of materials (BOM), and to release the items for production purposes; and generation of updated stock audits, as periodic survey measurements of depletions to ore reserves.

The system accordingly preferably includes:

a non-transitory computer accessible creator, capable of:

creating the programmable, comprehensive, repeatable design templates that represent specific mining technical activities, geometry and sequence of activities;

creating, assessing and implementing the rules with due appreciation of:

the inherent risks characteristic of the specific mining method; and operational guidelines of the specific mining company;

constructing the rules for each mining method with the specific intent to generate and visualize three-dimensionally:

mining technical activities;

their geometric patterns; and the sequence of such activities;

enabling the accrual of the relevant metrics for each mining operation, thereby creating the framework for financial integration;

a non-transitory computer accessible codifier, capable of:

dictating by means of the work breakdown structure a corresponding cost code structure in the ERP system to enable programmable planning and cost control of the use of resources for technical activities; and controlling the relevant granularity of costs in a direct, substantially real-time manner;

a non-transitory computer accessible assimilator, capable of:

providing for:

a specific mining method, in the form of a work breakdown structure;

its specific mining technical activities; and the activities' specific key performance indicators;

collecting and assimilating data continuously during the execution of the mining technical activities to:

determine;

classify; and track;

the changes in the state and status of the mineral deposit being mined;

thereby formalizing the corresponding changes in the state and/or status of the mining workspace, upon the execution of the mining technical activities;

a non-transitory computer accessible generator, capable of:

changing the state and status of the mineral deposit being mined into the inventory and stock items that are manageable within the inventory management system; and generating the inventory management system transactions, based on the state and/or status changes of the corresponding mineral resources and reserves, substantially as disclosed in PCT Patent Application PCT/ZA2014/000036; and a non-transitory computer accessible comparator, capable of:

determining and selecting the equivalency in granularity of the mining technical and the cost data in accordance with:

the pre-selected policies and procedures; and the preselected codes of practice;

within a particular mining company;

allowing at least semi-continuous master data governance within the mining company, thereby enabling control within the ERP system in an integrated fashion, of the:

planning;

exercising; and costing;

of the mining technical activities, including core and support mining execution activities; and allowing for:

issuance of the process works order, as an equivalent to a mining instruction a survey measuring list or a short term operational plan of activities;

issuance of the pro-forma inventory movement transactions, as daily bookings of mining activities;

issuance of the purchase order, for purchasing of items, such as required according to a pre-setup bill of materials, and to release the items for production purposes; and generation of the updated stock audits, as periodic survey measurements of depletions to ore reserves.

The system further preferably includes the following toolsets:

a mine design toolset, comprising a set of pre-selected mining specialist and geometric rules, for creating the three-dimensional layout of mining related excavations required to successfully enable the chosen mining method in the context of the known ore body;

a spatial data amalgamation, storage and visualization toolset, comprising a set of pre-selected renderings of 2- and 3-dimensional geometries based on theming rules and the ability to animate, query and filter geometries based on their properties and attributes, for the purposes of presenting themed renditions of the mine design, sequence, schedule and other pertinent geometries to concerned stakeholders from each stakeholders viewpoint; and a master mining business schedule toolset, comprising a set of pre-selected configurations of scheduled activities from across the spectrum of mining related activities for combining the scheduling and key performance indicator data requirements of disparate technical disciplines into a master mining business schedule, to enable integrated control of technical activities, including equipping, maintenance and other sub-schedules.

The system also preferably includes the following libraries:

a generic template library, for housing the created, generic templates according to different mining methods;

a company guidelines library, for housing company specific policies and procedures and codes of practice relating to the management of risk in different mining methods;

an accounting principles library, for housing the company specific policies and procedures and codes of practice relating to accepted accounting practice;

a mining method library, for housing standardized definitions and descriptions of the three-dimensional nature and specific information requirements of different mining methods;

a geometric rules library, for housing mining method specific formal arithmetic configurations of excavation designs;

a master mining business schedule library, for housing master mining business schedules generated as at selected times and/or for specific phases of development or operation, including equipping, maintenance and other sub-schedules;

a mineral evaluation rules library, for housing definitions and methodologies for evaluating mineral content of development, stoping, stockpiling, dilution control etc.; and a reporting code and practices library, for housing internationally accepted content and format of regulated mining company reporting.

According to a second aspect of the invention there is provided a computer-implemented method for planning and controlling multi-facet business activities over extended time periods, such as mining technical activities, during life of mine from concept and pre-feasibility assessment to closure in a mining operation for a mineral deposit, and enterprise support processes, such as costs, concurrently with such activities, in a direct substantially real-time manner, the method comprising the steps of:

providing a non-transitory computer readable storage medium storing computer-executable instructions, selected from at least one toolset, with mining technical activity, spatial and accounting rules, and at least one library, with company, mining technical and accounting codes and practices;

creating a work breakdown structure for a specific mining work place location and specific mining technical activities, representing at least partially in spatial geometries at a level of three-dimensional detail with preselected granularity in accordance with the planning and timeframe of the operation;

codifying in accordance with the work breakdown structure a corresponding cost code structure of substantially equivalent granularity;

assimilating pre-selected, measurable parameters of the mining activities;

generating inventory transactions, reflecting the change in state and status of the mineral deposit; and comparing, in an ERP system to enable at least semi-continuous mine planning and operation, the use of resources and the costs of such use, during such activities at pre-selected detail and granularity.

The work breakdown structure for the mining work place location and the mining technical activities may be created for a specific mining method, based on a mine design template created to reflect a set of mining method specific rules that are founded on mine design considerations and the sequential nature of mining work, to enable the planning of such mining method, with particular outcomes in pre-selected parameters or key performance indicators for associated mining technical activities, and the execution thereof to effect a change in the state and/or status of the workspace. The mining technical activities and, more specifically the resulting mining technical outcomes, may be selected from a group of core and support activities and outcomes, comprising a ventilated, developed, supported, mapped, constructed, equipped, inspected, trammed, hoisted and stockpiled workspace.

The mining method specific rules may be created, assessed and implemented with due appreciation of the inherent risks characteristic of the specific mining method and operational guidelines of a specific mining company. The rules for each mining method as reflected within a specific design template is preferably constructed with the specific intent to generate and visualize three-dimensionally, the specific mining technical activities, their geometry and the sequence of such activities, enabling the assimilation of the relevant pre-selected, measurable parameters, including specific metrics such as meters, square meters, cubic meters, tons mineral grades and mineral content for each mining operation, thereby creating the work breakdown structure for financial integration with the corresponding cost code structure of substantially equivalent granularity.

The method may further include the step of:

maintaining the granularity equivalency between the mining technical and the cost data at a pre-selected work breakdown structure level of detail according to specific policies and procedures and codes of practice within a particular mining company and through at least semi-continuous master data governance within the mining company.

The step of creating the work breakdown structure preferably includes the steps of:

creating a programmable, comprehensive, repeatable design template, with a non-transitory computer accessible creator:

representing specific mining technical activities, geometry and sequence of activities; and dictating a corresponding cost code structure in the ERP system to enable programmable planning and cost control of the use of resources for such activities at corresponding detail and granularity;

to accelerate the processes of planning and execution inclusive of relevant and appropriate costing.

The step of codifying the corresponding cost code structure preferably includes the step of:

codifying, at least semi-continually, the cost code structure, for integration with the ERP system.

The step of assimilating the measurable parameters preferably includes the step of:

assimilating, at least semi-continually, data providing the key performance indicators according to the pre-selected measurable parameters with a non-transitory computer accessible assimilator, during the execution of mining technical activities, thereby enabling the tracking of change in state and status over time and, more preferably, determining, classifying and tracking such changes.

The step of generating inventory transactions preferably includes the steps of, at least semi-continually:

receiving the changes in state and status of the mineral deposit being mined;

translating such changes into inventory and stock items that are manageable within an inventory management system; and generating inventory management system transactions, based on such state and/or status changes of the corresponding mineral resources and reserves, substantially as disclosed in PCT Patent Application PCT/ZA2014/000036;

with a non-transitory computer readable generator.

The step of comparing the use of resources and the costs of such use preferably includes the steps of:

comparing, in an at least partially-integrated fashion and accordance with the pre-selected policies and procedures and the codes of practice within the particular mining company, and master data governance, mining technical data and cost control data, with a non-transitory computer accessible comparator, during the planning, exercising and costing of mine technical activities, including core and support mining technical activities, preferably enabling:

issuing a process works order, as an equivalent to a mining instruction, a survey measuring list, or a short term operational plan of activities;

issuing pro-forma inventory movement transactions, as daily bookings of mining activities;

issuing a purchase order, for purchasing of items, such as required according to a pre-setup bill of materials, and to release the items for production purposes; and generating updated stock audits, as periodic survey measurements of depletions to ore reserves.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
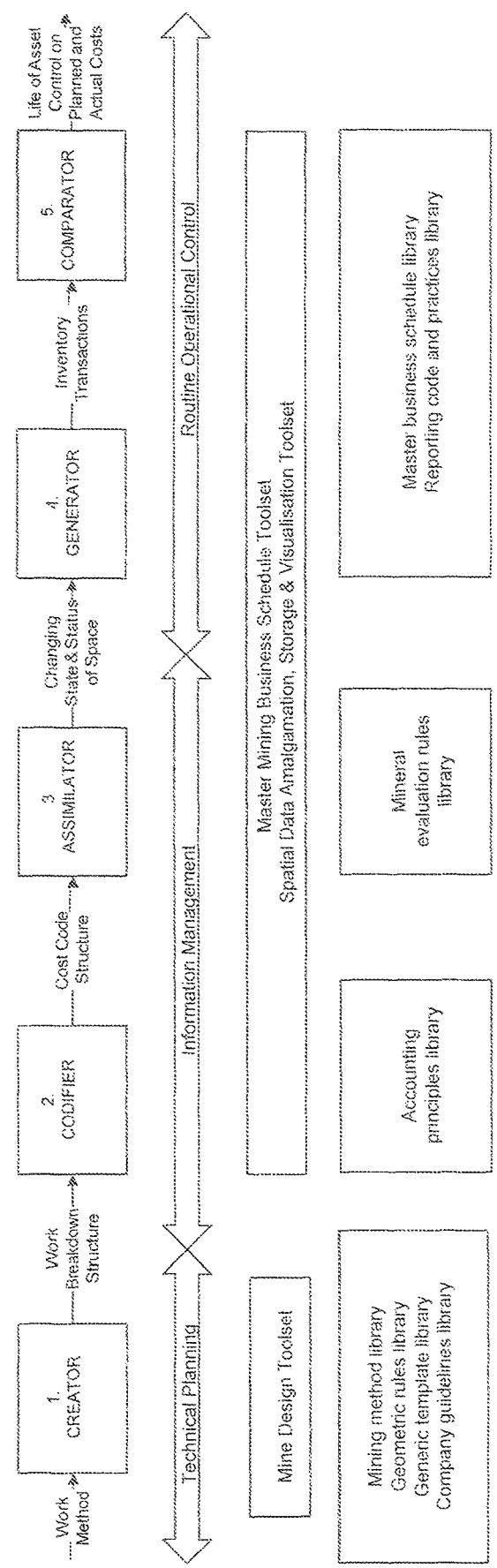
FIG. 1 is an illustrative diagram of components utilized in a system and method for planning and controlling multi-facet technical activites in a mining operation in accordance with one embodiment.
Figure 2:
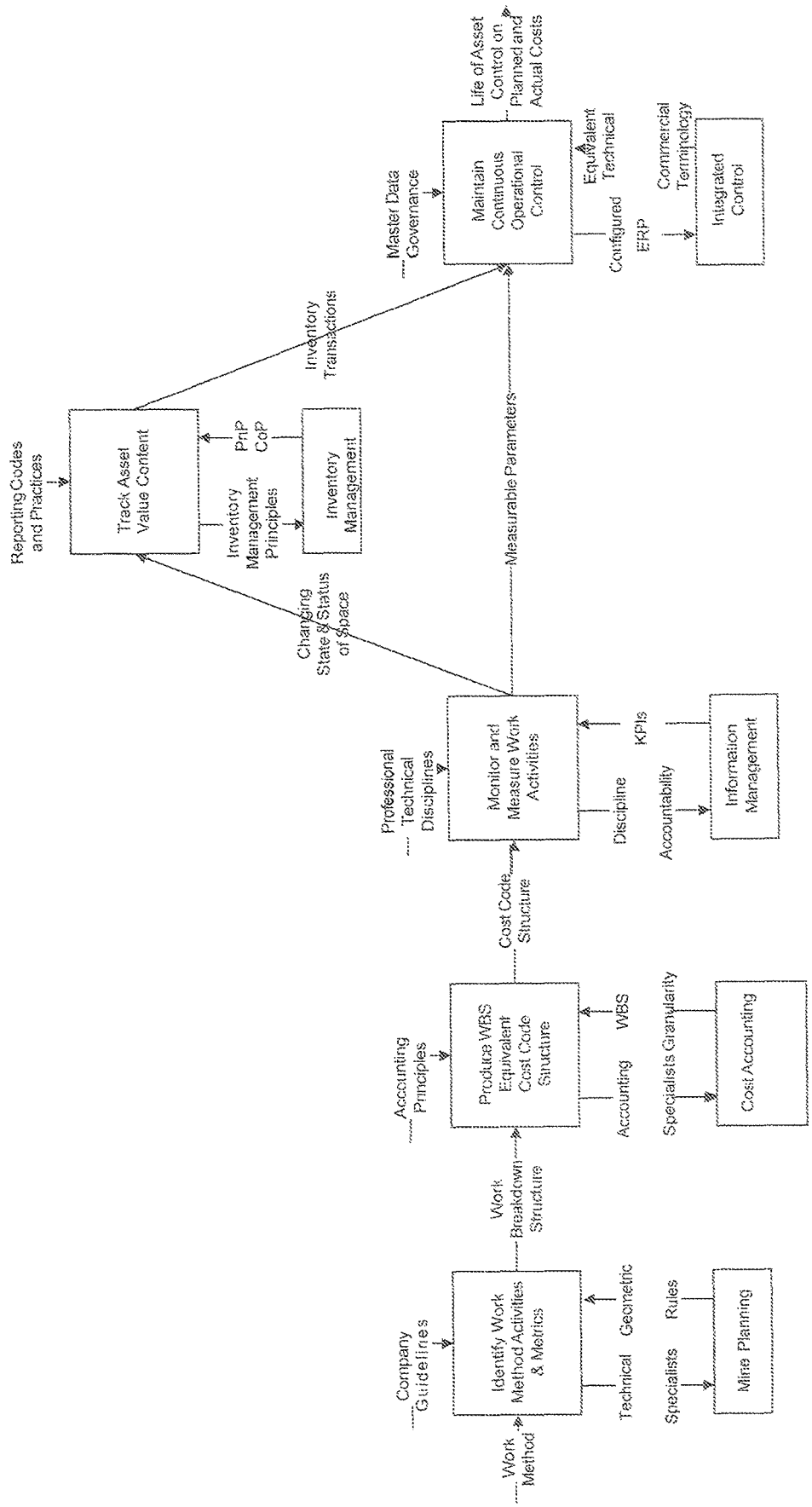
FIG. 2 is an illustrative diagram of the system and method of FIG. 1 incorporating an inventory management system in accordance with one embodiment.

A preferred embodiment of the invention shall now be described with reference to the following diagrams wherein:

FIG. 1 illustrates some of the physical componentry and non-transitory computer readable storage mediums, with preselected toolsets, of particular functionality, and corresponding libraries, with collections of resulting preselected compiled outcomes, for occasional application in a system and a method map for the planning and controlling of multi-facet business activities, in the form of mining technical activities, and of enterprise support processes, including costing and financial reporting, such as its chart of accounts (COA), concurrently and over extended time periods, during life of mine, such as from concept and pre-feasibility assessment to closure, in the mining of a mineral deposit, in a direct substantially real-time manner and in accordance with the invention; and FIG. 2 illustrates the system and the method as illustrated in FIG. 1 comprehensively, incorporating an inventory management system, as disclosed in PCT Patent Application PCT/ZA2014/000036, in accordance with the invention. The natural resource and reserve management system is characterized in having means for amalgamating and integrating data from disparate expert mining technical systems and applications, including computer developed or generated data, into at least one common, spatially-referenced database for use by at least one commercially available inventory management application, in order to provide integrated natural asset management in a natural resource inventory.

The system may be characterized wherein the natural resources and reserves are depletable mineral resources and reserves, the amalgamation and integration are conducted continually, and the data is from disparate expert technical systems and applications in order to provide integrated mineral asset management in a mineral resource inventory.

The system may be characterized in having means for:
integrating and amalgamating big volumes of multi-disciplinary mining technical information; and
leveraging the ability to process big volumes of data in an efficient manner;

thereby effectively bridging the divide between the complexity of multi-disciplinary mining technical information and the methodical world of reporting, analysis, simulation and optimization through translating technical interactions and observations in the relevant commercial context.

The system may be characterized in having means for analyzing and translating mining resources and reserves into inventory and stock items that are manageable in an inventory management system and application and are capable of being analyzed and reported on in a combination of existing inventory management applications and business intelligence applications.

The system may be characterized in being capable of processing changes in mining resources and reserves as a result of changes in the source data contained in any of the mining technical systems and applications in real time and updating the mineral resource inventory accordingly.

The system may be characterized in having means for reporting resources and reserves from within the mineral resource inventory in compliance with regulatory codes, as opposed to the current convention of reporting from a collection of typically non-integrated expert mining technical systems and applications.

According to a second aspect of the invention there is provided a natural resource and reserve management system characterized in having means for translating natural resources and reserves into inventory and stock items that are manageable within an inventory management system, leveraging real-time, big data computing capabilities in order to track over time any changes in the logical status or physical state of the resources and reserves at a granular, spatially indexed level and translating such changes into conventional inventory management transactions capable of being processed in an inventory management application as commercial transactions.

The system may be characterized wherein the natural resources and reserves are depletable mineral resources and reserves and wherein the translations are conducted continually, in order to track any changes over time in the logical status or physical state of the mineral resources and reserves at a pre-selected level of granulation and spatial index.

The system may be characterized in having business rules pertaining to the translation that synthesize mine technical and financial controls, regulatory codes and generally accepted best practices to ensure optimal exploitation of a mineral asset, including the application of capital to the mineral asset.

The system may be characterized in having means for amalgamating and translating technical interactions with and observations of the mineral asset by any technical and associated disciplines that effect changes to the logical status or physical state of the mineral asset at any given spatial location into materials management transactions, which are executed against the mineral resource inventory in the form of at least one of the group of inventory-orientated transactions comprising of:

accrual, mimicking procure or acquire transactions;
depletion, mimicking inventory or stock issue transactions;
shrinkage, mimicking theft or removal processing;
ullage, mimicking write-off of stock due to damage; and
movement, mimicking relocation of stock.

The system may be characterized in having means for translating at least some of the technical descriptions, annotations, features and properties data contained within the disparate expert proprietary mining technical systems and applications and solutions from which data is extracted, amalgamated and/or translated, to attributes of the inventory or stock within the mineral resource inventory.

The system may be characterized in having means for retaining at least some of the technical descriptions, annotations, features and properties data being configured within the mineral resource inventory system for analytical and descriptive purposes, based on the requirements of the customer organization.

The system may be characterized in having means for using at least some of the technical descriptions, annotations, features and properties data to conduct any one of the actions selected from the group consisting of reporting, analyzing, simulating, optimizing and performing analytics on the inventory or stock items and modeling the impact of interaction and observation by the various technical disciplines on the mineral asset, as performed within business intelligence and analytics platforms.

The system may be characterized in having means for reporting resources and reserves from within the mineral resource inventory in compliance with regulatory codes.

According to a third aspect of the invention there is provided a method for natural resource and reserve management, the method including the steps of:

integrating and amalgamating big volumes of multi-disciplinary technical data from disparate expert technical systems and applications, including computer developed and generated data, into at least one common, spatially-referenced dataset; and integrating the consolidated resultant dataset with at least one commercially available inventory management application;

in order to provide integrated natural asset management in a natural asset resource inventory, effectively bridging the divide between the complexity of multi-disciplinary technical information and the methodical world of accounting and audit practice through translating technical interactions and observations in the relevant commercial context.

The method may be characterized wherein the natural resources and reserves are depletable mineral resources and reserves, the amalgamation and integrations are conducted continually, and the data is from disparate expert mining technical systems and applications in order to provide integrated mineral asset management in a mineral resource inventory.

According to a fourth aspect of the invention there is provided a method for natural resource and reserve management wherein the natural resources and reserves are translated into inventory and stock items that are managed within an inventory management system, the method including the steps of:

tracking over time changes in the logical status or physical state of the resources and reserves at a granular, spatially indexed level, with the use of suitable big data computing capabilities; and translating such changes into conventional inventory management transactions for processing on an inventory management application as commercial transactions.

The method may be characterized wherein the natural resources and reserves are depletable mineral resources and reserves, the changes are tracked continually for purposes of a mineral inventory management system at a pre-selected level of granulation and spatial index.

The method may include the step of synthesizing mine technical and financial controls, regulatory codes and generally accepted best practices by means of a set of business rules for the translations to ensure optimal exploitation of a mineral asset.

The method may include the step of amalgamating and translating technical interactions with and observations of the mineral asset, by technical and associated disciplines that effect changes to the logical status or physical state of the mineral asset at any given spatial location, into materials management transactions, which are executed against the mineral resource inventory in the form of at least one of the inventory-orientated transactions selected from the group consisting of accrual, mimicking procure or acquire transactions; depletion, mimicking inventory or stock issue transactions; shrinkage, mimicking theft or removal processing; ullage, mimicking write-off of stock due to damage; and movement, mimicking relocation of stock.

The method may include the step of translating all technical descriptions, annotations, features and properties data contained within the disparate expert proprietary mining technical systems and applications and solutions, from which data is extracted, amalgamated and/or translated, to attributes of the inventory or stock within the mineral resource inventory.

The method may include the step of configuring at least some of the technical descriptions, annotations, features and properties data to persist within the mineral resource inventory system for analytical and descriptive purposes, based on the requirements of the customer organization.

The method may include at least one of the steps selected from the group consisting of reporting, analyzing, simulating, optimizing and performing analytics on the inventory or stock items and modeling the impact of interaction and observations by the various technical disciplines on the mineral asset, as performed within business intelligence and analytics platforms, with the use of at least some of the technical descriptions, annotations, features and properties data.

The method may include the step of reporting resources and reserves from within the mineral resource inventory in compliance with regulatory codes.

According to a fifth aspect of the invention there is provided a natural asset inventory, comprising of natural resources and reserves, translated into inventory and stock items that are manageable within an inventory management system with the use of big data computing capabilities in order to track over time any changes in the logical status or physical state of the resources and reserves at a granular, spatially indexed level, and wherein the such changes are translated into conventional inventory management transactions capable of being processed in the inventory management application as commercial transactions.

The natural asset inventory may be characterized wherein the natural resources and reserves are depletable mineral resources and reserves and wherein the change is effected by the impact of interaction and observations by the various technical disciplines on mineral assets in order to provide a mineral asset inventory at a pre-selected level of granulation and spatial index A system and a method suitable for planning and operating a multi-facet business such as a mining operation, from concept and pre-feasibility assessment to mine closure, and controlling the costs thereof, with reference to FIGS. 1 and 2, includes respectively a technical planning functionality, with its corresponding cycles and associated componentry, an information management functionality, with its corresponding cycles and associated componentry, and a routine operational control functionality, with its corresponding cycles and associated componentry.

FIG. 1 illustrates some of the physical componentry and non-transitory computer readable storage mediums, with the toolsets and libraries, in the preferred embodiment for integrating the mining technical and financial domains by means of the system and the method in accordance with the invention.

The toolsets assist in providing the required technical planning functionality, information management functionality, and routine operational control functionality, while the libraries are used to store the resulting collections of similar compilations. The physical componentry includes a non-transitory computer accessible creator 1, codifier 2, assimilator 3, generator 4, and comparator 5, respectively.

The creator 1 transforms a work method into the work breakdown structure. More particularly, the creator 1 creates the programmable, comprehensive, repeatable design templates that represent specific mining technical activities, geometry and sequence of activities. The creator 1 further creates, assesses and implements the rules with due appreciation of firstly, the inherent risks characteristic of the specific mining method; and secondly, the operational guidelines of the specific mining company.

The creator 1 also constructs the rules for each mining method with the specific intent to generate and visualize three-dimensionally, firstly, mining technical activities, secondly, their geometric patterns; and thirdly, the sequence of such activities.

The creator 1 further enables the accrual of the relevant metrics for each mining operation, thereby creating the framework for financial integration.

The resulting work breakdown structure is then codified by means of the codifier 2, into a cost code structure. More particularly, the codifier 2, by means of the work breakdown structure, firstly, dictates a corresponding cost code structure in the cost allocation section of a conventional ERP system to enable programmable planning and cost control of the use of resources for technical activities; and secondly, provides the basis to control the costs in a direct, substantially real-time manner.

The cost code structure is assimilated by means of the assimilator 3 to reflect the equivalent granularity changes in state and status of the mining work workspace and, more particularly, of the change in state and status of the mineral deposit being mined.

The assimilator 3 firstly provides for the specific mining method, in the form of the associated work breakdown structures, its specific mining technical activities, and the activities' specific key performance indicators. The assimilator 3 further collects and assimilates data continuously during the execution of the mining technical activities to determine, classify and track the resultant changes in the state and status of the mineral deposit being mined, thereby formalizing the corresponding changes of the mining workspace, upon the execution of the mining technical activities.

The generator 4 transforms the changes in the state and status of the mineral deposit being mined into corresponding inventory and stock items that are manageable within the inventory management system. The generator 4 further generates the associated inventory management system transactions, based on these state and/or status changes of the corresponding mineral resources and reserves. This system and the corresponding process are substantially as disclosed in PCT Patent Application PCT/ZA2014/000036.

The inventory management system transactions are then compared, with the use of the comparator 5, with reference to the particular mining company's master data governance and at a pre-determined and selected equivalency in granularity between the mining technical activities and the cost data, in accordance with pre-selected policies and procedures as well as preselected codes of practice within the particular mining company.

More particularly, the comparator 5 regulates and maintains the equivalency in granularity of the mining technical and the cost data in accordance with the pre-selected policies and procedures and the preselected codes of practice, within a particular mining company.

The comparator 5 enables at least semi-continuous master data governance within the mining company, thereby enabling control within the company's ERP system in an integrated fashion, of the planning, exercising and costing respectively of the mining technical activities, including core and support mining execution activities.

The comparator 5 then enables issuance of a process works order as an equivalent to a mining instruction, a survey measuring list, or a short term operational plan of activities, issuance of pro-forma inventory movement transactions as daily bookings of mining activities; issuing a purchase order, for purchasing of items, such as required according to a pre-setup bill of materials, and to release the items for production purposes; and updating of stock audits with periodic survey measurements of depletions to ore reserves.

FIG. 2 shows the integrated Life of Mine Planning and Cost Control system and method, for Templated Integration of Mining Technical and Financial Domains, together with the inventory management system, as disclosed in PCT Patent Application PCT/ZA2014/000036, and is detailed in accordance with the invention.

In the preferred embodiment and for a given or pre-selected mining method, a design template is created during the technical planning cycles that reflects a set of mining method specific rules that are founded on mine design considerations and the sequential nature of mining work to enable the planning process.

The system accordingly includes the following toolsets with mining technical activity, spatial and accounting rules:

a mine design toolset, comprising a set of pre-selected mining specialist and geometric rules, for creating the three-dimensional layout of mining related excavations required to successfully enable the chosen mining method in the context of the known ore body; a spatial data amalgamation, storage and visualization toolset, comprising a set of pre-selected renderings of 2- and 3-dimensional geometries based on theming rules and the ability to animate, query and filter geometries based on their properties and attributes, for the purposes of presenting themed renditions of the mine design, sequence, schedule and other pertinent geometries to concerned stakeholders from each stakeholders viewpoint; and a master mining business schedule toolset, comprising a set of pre-selected configurations of scheduled activities from across the spectrum of mining related activities for combining the scheduling and key performance indicator data requirements of disparate technical disciplines into a master mining business schedule, to enable integrated control of technical activities, including equipping, maintenance and other sub-schedules.

The system also includes the following libraries with company, mining technical and accounting codes and practices:

a generic template library, for housing the created, generic templates according to different mining methods;

a company guidelines library, for housing company specific policies and procedures and codes of practice relating to the management of risk in different mining methods;

an accounting principles library, for housing the company specific policies and procedures and codes of practice relating to accepted accounting practice;

a mining method library, for housing standardized definitions and descriptions of the three-dimensional nature and specific information requirements of different mining methods;

a geometric rules library, for housing mining method specific formal arithmetic configurations of excavation designs;

a master business schedule library, for housing master business schedules generated as at selected times and/or for specific phases of development or operation, including equipping, maintenance and other sub-schedules;

a mineral evaluation rules library, for housing definitions and methodologies for evaluating mineral content of development, stoping, stockpiling, dilution control, etc.;

and a reporting code and practices library, for housing internationally accepted content and format of regulated mining company reporting.

The rules are created, assessed and implemented with due appreciation of the inherent risks characteristic of the mining method and operational guidelines of a specific mining company.

The template creation requires sufficient mining expertise to comprehend the complexities of the particular mining method to identify the applicable rules and resultant geometric patterns to be embodied within the template. It is envisaged that a proprietary design criteria toolset with preselected granularity could be utilized for the codification of the required rules.

The generic template library houses the repeated template creations, resulting in an expanding library of generic configurable templates applicable to the wide spectrum of mining methods in general and the designated mining methods in particular.

The rules for each mining method as reflected within a specific design template are constructed with the specific intent to generate and visualize three-dimensionally, both mining geometry and activity sequence by means of a proprietary spatial data amalgamation, storage and visualization toolset. This results in the accrual of relevant metrics such as meters, square meters, cubic meters, tons, mineral grades and mineral content for each mining operation, thereby creating the framework for financial integration.

The activities required for putting a specific mining layout geometry into practice generate a schedule of work content pertaining to the given mining method that is broken down into varying levels of three-dimensional activity detail, e.g. development, stoping, overburden removal, dredging, etc., appropriate to and as required for the planning timeframe e.g. short, medium or long term, etc. The relevance of these activities and associated terminology is determined by the requirements of the specific mining method, the levels of three-dimensional detail appropriate to the time period under consideration and the mining company's processes and formal practice.

The various mining technical disciplines are responsible for measuring, monitoring and managing the dynamic equilibrium or ongoing balance of work content across the various categories and detail of mining activity. This involves both core mining disciplines such as geology, survey, mining engineering, etc., and support and service disciplines such as finance, information management, health and safety, etc. The control of the activities is based on the specific key performance indicators and/or measurable parameters for which data is collected continually during execution of a mine plan over the life of the mine.

Mining outcomes are achieved with the completion of various activity types and activities, thereby changing the state and/or status of the workspace to developed, equipped, immediately available, temporarily unavailable, etc.

The continual collection and assimilation of data during activities in a mining technical context enables the tracking of change in state and status of space over time. Such state and status are determined and classified in a book of standards by each of the mining disciplines as they interact within the mining workspace in the transformation of a mining operation from planning, through execution to closure. This tracking of the changes in state and status in turn enables the translation of the mineral deposit being mined into inventory and stock items that are manageable within an inventory management system, and the generation of inventory management system transactions based on physical state and/or logical status changes of the corresponding mineral resources and reserves, as disclosed in PCT Patent Application PCT/ZA2014/000036.

In the associated costing functionality, the work breakdown structures dictate corresponding cost code structures in the ERP system to enable planning and cost control of the use of resources for such technical activities at the corresponding detail and granularity. The costing systems in use at any particular mining company will therefore have a consistent level of data granularity in accordance with the dictating design templates as provided for in the present invention.

It is therefore a specific aspect of the present invention to enable the alignment of mining technical activity and cost granularity, as revealed in and dictated by the formation of a mining technical system and method related work breakdown structure.

In practice, a mining company typically has its own specific terminology and wants to cover the spectrum of planning from detailed, immediate operational needs to the broader time and context requirements of strategic business planning.

It is therefore envisaged that the invention would be exercised with the assistance of a suitable master mining business schedule toolset, capable of handling the multiple levels of detail reasonably required for a work breakdown structure and a cost code structure with equivalent granularity for a particular mining method. More particularly, it is envisaged that the invention would be exercised also with the benefit of being able to generate a suitable master mining business schedule, capable of reflecting the multiple levels of detail reasonably required for a work breakdown structure and a cost code structure with equivalent granularity for such mining method.

The required equivalency in granularity of mining technical and cost data can be selected and determined in accordance with the policies and procedures and the codes of practice within each mining company.

It is further envisaged that maintaining the granularity match of mining technical and cost data at the work breakdown structure level of detail would be accommodated by continuous master data governance within the mining company.

Matching granularity of mining technical and cost data also implies configuring the mining company financial management system, used to generate the cost and/or profit center structure/s as per the correct chart of accounts attributes to accommodate equivalent mining technical terminology, such as by means of an instruction to a mining team, or so-called survey note, to become or reflect a corresponding process works order.

Further configuration, development of equivalent terminology and detailed cost aggregation will be implemented as a natural consequence of this approach. This effort is warranted by the business benefits of integrated mining technical and financial data streams and the direct association for cost control. Some current business processes in both the mining technical and financial domains will be streamlined or classified as no longer being required.

Continuous, integrated management and control of the data from both mining technical and financial environments will be reflected in the continuous visibility of planned and actual costs over the life of the mine.

The invention enables reciprocal references between the mining technical and financial domains from planning through to execution and cost control. Such reference is further established through a unique coding or numbering identifier, of the volumes in space, as defined by mining technical activities, as disclosed in PCT Patent Application PCT/ZA2014/000036 and as described therein. The mineral resource inventory management system and associated process as described in that application provide, firstly, for the integration of data from disparate expert proprietary mining technical systems, applications and solutions, designed to service the discrete needs of specific mining technical disciplines within mining operations and, secondly, for the amalgamation of such data into a single spatially-indexed data structure encapsulating all spatial, design, descriptive and quantification attributes related to the source data, providing a perspective that reflects a multi-disciplinary perspective on any given spatial location.

The mineral resource management system contains a spatial database and mining feature set, which implements a configuration capability as a mineral parameter meter that sets firm perspectives on variables which are acceptable between specific bounds, relative to an academic mean. This includes parameters such as density, interpretation of major faults as geological loss factors, commodity price, mine call factor, pothole losses, mining overbreak, labor efficiency, etc. This relates to a configurable interpretation of mining factors that becomes a constant through which translation occurs. This allows it to be configurable per ore body, commodity or legal entity such as a company to align classification of inventory and stock in an inventory management application platform to the related resource and reserve reporting codes.

The invention further enables more appropriate allocations of detailed costs to planned core mining activities to establish and monitor feasibility and to control efficiency of activities and therefore of the operations in three-dimensional detail with preselected granularity. The invention therefore overcomes the inefficient indirect, fragmented and dissociated mechanism for allocation of costs in the known planning and costing systems and methods in the prior art.

Out of the planning system, the invention proposes the creation of a cost center structure as the key to creating a network in which to reconcile the various appropriate levels of granularity required for planning and control of resource allocation to core mining technical activities within a particular mining template or specific mining method.

The system and the method according to the invention are based explicitly on the deconstruction of the mining method to a tem plated instruction for creating spatial geometries representing the activities inside the mining method template that enable fixed and variable metrics to be derived for control purposes.

The invention discloses the creation of a network of mining work place location and activities during the planning process which are absorbed into the ERP cost code allocation mechanism. The invention is based on the knowledge of the ongoing cost of allocation of resources, including technical, human and financial resources, such as machines, methods, materials, measurements, manpower and funds. The invention therefore, rather than an indirect costing of applied resources, considers specifically the actual mining methods, in three-dimensional detail at a suitable, preselected granularity, the relevant tasks of such mining activities and the allocation of resources to them.

The invention therefore enables the provision of the following:

control against the planned use of resources in mining technical activities at a level of three-dimensional detail with preselected granularity relevant to the planning and execution timeframe under consideration;

control within the ERP system, in an integrated fashion, of the core and support mining execution activities;

control functions inside the ERP system which translate to and enable conventional functionality such as the:

issuance of process works orders, as mining instructions, survey measuring lists, or short term operational plans of activities;

issuance of pro-forma inventory movement transactions, as daily bookings of mining activities;

issuance of a purchase order, for purchasing of items, such as required according to a pre-setup bill of materials, and to release the items for production purposes; and generation of updated stock audits, as periodic survey measurements of depletions to ore reserves.

It is accordingly envisaged that the system and the method according to the invention would provide for the creation of programmable, comprehensive, repeatable design templates that represent specific mining technical activities, geometry and sequence of activities, and dictate corresponding cost code structures in the ERP system to enable programmable planning and cost control of the use of resources for such technical activities at corresponding detail and granularity to accelerate the processes of planning and execution inclusive of relevant and appropriate costing.

The method, particularly, for planning and controlling multi-facet mining technical activities, during life of mine from concept and pre-feasibility assessment to closure in a mining operation for a mineral deposit, and enterprise support processes, such as costs, concurrently with such activities, includes the steps of:

creating a work breakdown structure for a specific mining work place location and specific mining technical activities, represented at least partially in spatial geometries at a level of three-dimensional detail with preselected granularity in accordance with the planning and timeframe of the operation;

codifying in accordance with the work breakdown structure a corresponding cost code structure of substantially equivalent granularity;

assimilating pre-selected, measurable parameters of the mining activities;

generating inventory transactions, reflecting the change in state and status of the mineral deposit; and comparing, in the ERP system to enable at least semi-continuous mine planning and operation, the use of resources and the costs of such use, during such activities at pre-selected detail and granularity.

The method further includes the steps of maintaining the granularity equivalency between the mining technical and the cost data at a pre-selected work breakdown structure level of detail according to specific policies and procedures and codes of practice within the particular mining company and through at least semi-continuous master data governance within the company.

The step of creating the work breakdown structure includes the steps of creating a programmable, comprehensive, repeatable design template, representing specific mining technical activities, geometry and sequence of activities; and dictating a corresponding cost code structure in the cost allocation portion of the ERP system to enable programmable planning and cost control of the use of resources for such activities at corresponding detail and granularity; to accelerate the processes of planning and execution control inclusive of relevant and appropriate costing.

The step of codifying the corresponding cost code structure includes the step of codifying, at least semi-continually, the cost code structure, for integration with the ERP system. The step of assimilating the measurable parameters in turn includes the step of assimilating, at least semi-continually, data providing the key performance indicators according to the pre-selected measurable parameters during the execution of mining technical activities, thereby enabling the tracking of change in state and status over time and, more preferably, determining, classifying and tracking such changes.

The step of generating inventory transactions includes the steps of, continually, receiving the changes in state and status of the mineral deposit being mined; translating such changes into inventory and stock items that are manageable within an inventory management system; and generating inventory management system transactions, based on such state and/or status changes of the corresponding mineral resources and reserves, substantially as disclosed in PCT Patent Application PCT/ZA2014/000036: a computer-implemented system and method for depletable, natural asset management, accounting and analysis in accordance with the invention.

The computer-implemented system includes a non-transitory computer readable storage medium (not shown), storing computer-executable instructions, capable of extracting, amalgamating, translating and integrating big volumes of multi-disciplinary mining technical information/data from the disparate expert technical systems and applications, including computer developed or generated data, into the common, spatially-referenced database for use by the inventory management application to provide integrated mineral asset management in the mineral resource and reserve inventory of the preferred embodiment.

The computer-implemented system effectively bridges the divide between the complexity of multi-disciplinary mining technical information and the methodical world of reporting, analysis, simulation and optimization through translating technical interactions and observations in the relevant commercial context.

The system further includes a non-transitory computer accessible extractor 100 as means for extracting the data. The extractor extracts the aboriginal data, inclusive of its appropriate spatial geometries and mindful of the industry generic and geological and mining environment specific modifying factors as they relate to the regulated definition of resources and reserves for various mineral occurrences.

The system further includes a non-transitory computer accessible amalgamator as means for amalgamating multi-disciplinary mining technical information. The amalgamator transforms the extracted information into a globally standardized format, thereby making the resultant data available for further multi-disciplinary visualization and analysis, enabling accounting for the financial impact of mining technical activity resulting in changes to the state and status of the mineral asset.

The system further includes a non-transitory computer accessible translator 102 as means for translating the amalgamated data, and hence the corresponding natural resources and reserves, into inventory and stock items and transactions manageable within an inventory management system. The translator leverages real-time, big data computing capabilities in order first, to track over time any changes in the source data, as contained in any of the mining technical systems and applications and hence, any change in the logical status or physical state of the related resources and reserves, at a granular, spatially indexed level, and second, to translate such data changes in real time into conventional inventory management transactions capable of being processed in an inventory management application as commercial transactions.

Retaining the available detail associated with multi-disciplinary mining technical activities requires dealing with large mining technical datasets at various levels of granularity. This is accommodated by use of the composite reporting constant in its smallest geometric configuration containing the amalgamated aboriginal data of interest.

The system further includes a non-transitory computer accessible analyzer 103 as means for analyzing at least some of the technical descriptions, annotations, features and properties data being configured within the mineral resource inventory system for analytical and descriptive purposes, based on the requirements of a customer organization.

The analyzer conducts activities such as reporting, analyzing, simulating, optimizing and performing analytics and modeling the impact of interaction and observation by the various technical disciplines on the mineral asset, as performed within business intelligence and analytics platforms.

Timely supply of information for reporting and analytical requirements is accomplished by leveraging the ability to process large volumes of data in an efficient manner, employing current and future big data platforms such as in-memory databases.

The combination of well managed data and efficient processing is fundamental to the successful translation from mining technical activities as described by mining technical professionals to inventory transaction terminology and format as understood by accounting professionals.

Mining technical activity and observations of the mineral asset by any technical and associated disciplines that effect changes to the logical status or physical state of the mineral asset at any given spatial location can therefore be executed against the inventory of mineral resources and reserves as inventory-orientated transactions such as accrual (mimicking procure or acquire transactions), depletion (mimicking stock or inventory issue transactions), shrinkage (mimicking theft or removal processing), ullage (mimicking write-off of stock due to waste or damage, etc.), and move (mimicking simple relocation of stock without further processing).

More particularly, the invention translates mining technical transactions from a wide range of disparate, proprietary expert applications into inventory transactions through integrating data across the total mining technical systems domain and amalgamates such data into a single source; then transacts all mining activities within any commercially available inventory management application in order to manage the mineral asset within the bounds of generally accepted best practices. The invention enables both the commercial management competencies and the mining technical competencies within a mining organization to collaborate in the management of the mineral asset to its maximum value as if within a single, controlled technology domain and chart of accounts. The invention enables commercial modeling and scenario management through the application of standard business intelligence tools and techniques to the amalgamated model.

The invention also instantiates a discrete spatial constant against which mining technical activities are translated to commercially oriented inventory transactions, thereby introducing an advanced level of objectivity into the valuation of mineral assets.

The invention further translates geological and other mining technical activities impacting the mineral asset into conventional inventory transactions, managed in any commercially available inventory management application, thus introducing the ability to include the mineral asset in the chart of accounts of a mining company. History of changes driven by technical activities is managed within the inventory application and enables auditability and traceability and extends to versioning reporting across timelines. The total lifecycle, technical and commercial, can be audited from a single point and platform.

The step of comparing the use of resources and the costs of such use includes the steps of comparing, in an integrated fashion and accordance with the pre-selected policies and procedures and the codes of practice within the particular mining company, and master data governance, mining technical data and cost control data during the planning, exercising and costing of mine technical activities, including core and support mining technical activities, thereby enabling the issuing of a process works order, as an equivalent to a mining instruction; the issuing of a picking list, as a survey measuring list; the issuing of a purchase order as a short term operational plan of activities; the issuing of pro-forma inventory movement transactions, as daily bookings of mining activities; the issuing a purchase order, for purchasing of items, such as required according to a pre-setup bill of materials, and to release the items for production purposes; and the generating of updated stock audits, as periodic survey measurements of depletions to ore reserves.

It will also be appreciated that many variations in detail are possible without departing from the scope and/or spirit of the inventions as set out in the claims hereinafter, such as the application of the invention in the exploitation of other natural resources, in the technical and/or financial auditing, optimization and/or assessment of future or at least partially executed multi-facet business activities, such as existing mining operations, and in multi-facet infrastructure developments.

The invention claimed is:

1. A computer-implemented system for planning and controlling multi-facet technical activities over extended time periods, including mining technical activities, and enterprise support processes, including costs, concurrently with the execution of such technical activities, in a mining operation at a natural resource or reserve, including a mineral deposit, with the use of disparate, expert technical systems and applications, and the disparate technical data therefrom, including disparate technical descriptions, annotations, features and properties data, defining spatial geometries and attributes of specific spatial locations in such resource or reserve, the integration of the geometries and attributes at such spatial locations and the tracking over time of changes in the logical status or physical state of the resource or reserve at such locations due to such technical activities and specific, measurable parameters resulting therefrom, at least semi-continuously in a direct, substantially real-time manner during such operation, the system comprising:

a non-transitory computer readable storage medium, storing computer-executable instructions, selected from at least one toolset, including technical activity, spatial and accounting rules, and at least one library, with company, technical and accounting codes and practices;

means for creating a technical work breakdown structure, defining a specific, three-dimensional work place location and specific technical activities to be executed at the specific work place location, represented at least partially in three-dimensional, spatial geometries at a level of detail with preselected granularity in accordance with the planning and timeframe of the operation, wherein the specific work place location corresponds to a specific, three-dimensional spatial location within a natural resource or reserve, including a mineral deposit;

means for codifying in accordance with the work breakdown structure a corresponding cost code structure of substantially equivalent granularity;

means for assimilating pre-selected, measurable parameters of the technical activities, including identified resource or reserve modifying factors, to enable the tracking of specific parameters and the impact of the associated activities on the spatial geometries and the attributes of the specific spatial location in the resource or reserve and the change in the state and/or status of the workspace at such location and the associated change in the logical status or physical state of the resource or reserve at such workspace;

means for generating inventory transactions, reflecting change in the physical state and logical status of a workspace;

means for executing, by control of a computer, at least one specific technical activity, including a mining technical activity, at the specific work place location in accordance with the work breakdown structure;

means for amalgamating the work breakdown structure, the cost code structure, the assimilated preselected, measurable parameters of the at least one mining executed activity being executed, including the modifying factors, and the inventory transactions into a single spatially-indexed data structure encapsulating all spatial, design, descriptive and quantification attributes related thereto, including technical descriptions, annotations, features and properties defining spatial geometries and attributes, without repopulating all the data contained within the spatially-indexed data structure;

at least one common, integrated spatially-referenced database configured to retain the spatially-indexed data structure, inclusive of at least three-dimensional, technical geometries and attributes of specific, three-dimensional spatial locations within the resource or reserve;

means for translating, by control of the computer, the amalgamated and spatially-indexed work breakdown structure, the cost code structure, the assimilated preselected, measurable parameters of the at least one mining executed activity being executed, including the modifying factors, and the inventory transactions into attributes of inventory or stock within a resource inventory;

means for updating the work breakdown structure responsive to an output of the means for generating inventory transactions reflecting the change in the physical state and status of the workspace corresponding to the specific location responsive to the at least one specific technical activity being executed;

means of comparing, in an ERP system to enable at least semi-continuous mine planning and control, the use of resources in the at least one mine technical activity and the costs of such use, during such activity at preselected detail and granularity; and means for analyzing at least some of the spatially-indexed data structure, encapsulating at least some of the spatial, design, descriptive and quantification attributes related thereto, to execute analytic activities selected from the group consisting of technical modeling, of the impact of interaction and observation by at least one technical discipline on the resource or reserve, and analyzing, simulating, optimizing and reporting on the inventory or stock items;

wherein the means for creating, the means for codifying, the means for assimilating, the means for generating, the means for executing, the means for amalgamating, the means for translating, the means for updating and the means for comparing are embodied in non-transitory computer readable storage media executed by the computer, and wherein:
the spatially-referenced database is usable by a commercially available inventory management system or application and the translated work breakdown structure, the cost code structure, assimilated preselected, measurable parameters, including the modifying factors, and inventory transactions constitute inventory and stock items and transactions manageable within the ERP system that track over time the change in the logical status or physical state of the resource or reserve at such granular, spatially index level in relation to that location, and the spatially-referenced database and the translated work breakdown structure, the cost code structure, assimilated preselected, measurable parameters, including the modifying factors, and inventory transactions retain the spatially indexed, technical geometries and attributes at such spatial location enabling:
the integration and amalgamation of such data into a single spatially-indexed data structure encapsulating the spatial, design, descriptive and quantification attributes related to the source data, providing a multi-collective, multi-disciplinary technical perspective of a given spatial location in the resource or reserve, and
interoperability between the disparate, mining technical systems and applications, by allowing extraction and reconstitution of such integrated and amalgamated spatial and attribute data from the spatially-referenced database into the file format and structure required by the technical systems and applications, the ERP system and the inventory management system.

2. The system as claimed in claim 1 wherein the business activities are mining technical activities, typically executed during life of mine from concept and pre-feasibility assessment to closure in a mining operation for a mineral deposit, and wherein the technical activities comprise mining technical activities and the work breakdown structure is for a specific mining work place location.

3. The system as claimed in claim 2 wherein:
the work breakdown structure for the mining work place location and the mining technical activities is created for a specific mining method, based on a mine design template created to reflect a set of mining method specific rules that are founded on mine design considerations and the sequential nature of mining work, to enable the planning of such mining method, with particular outcomes in pre-selected parameters for associated mining technical activities, and the execution thereof to effect a change in the physical state and/or status of the mining workspace;

wherein the outcomes are selected from a group of mining technical outcomes comprising a ventilated, developed, supported, mapped, constructed, equipped, inspected, trammed, hoisted and stockpiled workspace;

wherein the mining method specific rules are created, assessed and implemented based on inherent risks characteristic of the specific mining method and operational guidelines of a specific mining company;

wherein the rules are constructed to generate and visualize three-dimensionally, the specific mining technical activities, their geometry and the sequence of such activities, enabling the assimilation of the relevant pre-selected, measurable parameters, including specific metrics such as meters, square meters, cubic meters, tons, mineral grades and mineral content for each mining operation, thereby creating the work breakdown structure for financial integration with the corresponding cost code structure of substantially equivalent granularity; and wherein the system has means for maintaining the granularity equivalency between the mining technical and the cost data at a pre-selected work breakdown structure level of detail according to specific policies and procedures and codes of practice within a particular mining company and through at least semi-continuous master data governance within the mining company.

4. The system as claimed in claim 2 wherein:
the means for creating the work breakdown structure is capable of creating a programmable, comprehensive, repeatable design template that:
represents specific mining technical activities to be executed, geometry and sequence of activities at pre-selected detail and granularity; and
dictates a corresponding cost code structure in the ERP system to enable programmable planning and cost control of the use of resources for such activities at corresponding detail and granularity;
to accelerate the processes of planning and execution inclusive of relevant and appropriate costing;
wherein the means for codifying the corresponding cost code structure is capable of codifying, at least semi-continually, the cost code structure, for integration with the ERP system;
wherein the means for assimilating the measurable parameters is capable of assimilating, at least semi-continually, data providing specific key performance indicators according to the pre-selected measurable parameters during the execution of mining technical activities to enable the tracking of change in the physical state and status over time and, preferably, for determining, classifying and tracking such changes;
wherein the means for generating inventory transactions is capable of, at least semi-continually, receiving the changes in the physical state and status of the mineral deposit being mined; translating such changes into inventory and stock items that are manageable within an inventory management system; and generating inventory management system transactions, based on such physical state and/or status changes of the corresponding mineral resources and reserves; and wherein the means for comparing the use of resources and the costs of such use is capable of comparing, in an at least partially-integrated fashion and accordance with the pre-selected policies and procedures and the codes of practice within the particular mining company, and master data governance, mining technical data and cost control data during the planning, exercising and costing of mine technical activities, including core and support mining technical activities, allowing for pre-selected functionality.

5. The system as claimed in claim 4 wherein the pre-selected functionality is selected from the group comprising:
issuance of a process works order, as an equivalent to a mining instruction, a survey measuring list, or a short term operational plan of activities;
issuance of pro-forma inventory movement transactions, as daily bookings of mining activities;
issuance of a purchase order, for purchasing of items, such as required according to a pre-setup bill of materials, and to release the items for production purposes; and
generation of updated stock audits, as periodic survey measurements of depletions to ore reserves.

6. The system as claimed in claim 2 wherein:
the means for creating the work breakdown structure comprises a non-transitory computer accessible creator, capable of:
creating the programmable, comprehensive, repeatable design templates that represent specific mining technical activities, geometry and sequence of activities;
creating, assessing and implementing the rules with due appreciation of:
the inherent risks characteristic of the specific mining method; and
operational guidelines of the specific mining company;
constructing the rules for each mining method with the specific intent to generate and visualize three-dimensionally:
mining technical activities;
their geometric patterns; and
the sequence of such activities;
enabling the accrual of the relevant metrics for each mining operation, thereby creating the framework for financial integration;
wherein the means for codifying the corresponding cost code structure comprises a non-transitory computer accessible codifier, capable of:
dictating by means of the work breakdown structure a corresponding cost code structure in the ERP system to enable programmable planning and cost control of the use of resources for technical activities; and
controlling the costs in a direct, substantially real-time manner;
wherein the means for assimilating the measurable parameters comprises an non-transitory computer accessible assimilator, capable of:
providing for:
a specific mining method, in the form of a work breakdown structure;
its specific mining technical activities to be executed; and
the activities' specific key performance indicators;
collecting and assimilating data continuously during the execution of the mining technical activities to:
determine;
classify; and
track;
the changes in the physical state and status of the mineral deposit being mined;
thereby formalizing the corresponding changes in the physical state and/or status of the mining workspace, upon the execution of the mining technical activities;
wherein the means for generating inventory transactions comprises a non-transitory computer accessible generator, capable of:
changing the physical state and status of the mineral deposit being mined into the inventory and stock items that are manageable within the inventory management system; and
generating the inventory management system transactions, based on the physical state and/or status changes of the corresponding mineral resources and reserves;
wherein the means for comparing the use of resources and the costs of such use comprises a non-transitory computer accessible comparator, capable of:
determining and selecting the equivalency in granularity of the mining technical and the cost data in accordance with the pre-selected policies and procedures and the preselected codes of practice within a particular mining company,
allowing at least semi-continuous master data governance within the mining company, thereby enabling control within the ERP system in an integrated fashion, of the:
planning;
exercising; and
costing;
of the mining technical activities, including core and support mining execution activities; and allowing for:
issuance of the process works order, as an equivalent to a mining instruction, a survey measuring list, or a short term operational plan of activities;
issuance of the pro-forma inventory movement transactions, as daily bookings of mining activities;
issuance of the purchase order, for purchasing of items, such as required according to a pre-setup bill of materials (BOM), and to release the items for production purposes; and
generation of the updated stock audits, as periodic survey measurements of depletions to ore reserves.

7. The system as claimed in claim 2 wherein the toolset includes at least one selected from the group comprising:
a mine design toolset, comprising a set of pre-selected mining specialist and geometric rules, for creating the three-dimensional layout of mining related excavations required to successfully enable the chosen mining method in the context of the known ore body;
a spatial data amalgamation, storage and visualization toolset, comprising a set of pre-selected renderings of 2- and 3-dimensional geometries based on theming rules and the ability to animate, query and filter geometries based on their properties and attributes, for the purposes of presenting themed renditions of the mine design, sequence, schedule and other pertinent geometries to concerned stakeholders from each stakeholders viewpoint; and a master mining business schedule toolset, comprising a set of pre-selected configurations of scheduled activities from across the spectrum of mining related activities for combining the scheduling and key performance indicator data requirements of disparate technical disciplines into a master mining business schedule, to enable integrated control of technical activities, including equipping, maintenance and other sub-schedules.

8. The system as claimed in claim 2 wherein the library includes at least one selected from the group comprising:
a generic template library, for housing the created, generic templates according to different mining methods;
a company guidelines library, for housing company specific policies and procedures and codes of practice relating to the management of risk in different mining methods;
an accounting principles library, for housing the company specific policies and procedures and codes of practice relating to accepted accounting practice;
a mining method library, for housing standardized definitions and descriptions of the three-dimensional nature and specific information requirements of different mining methods;
a geometric rules library, for housing mining method specific formal arithmetic configurations of excavation designs;
a master business schedule library, for housing master business schedules generated as at selected times and/or for specific phases of development or operation, including equipping, maintenance and other sub-schedules;
a mineral evaluation rules library, for housing definitions and methodologies for evaluating mineral content of development, stoping, stockpiling, or dilution control; and
a reporting code and practices library, for housing internationally accepted content and format of regulated mining company reporting.

9. A computer-implemented method for planning and controlling multi-facet technical activities over extended time periods, including mining technical activities, and enterprise support processes, including costs, concurrently with the execution of such technical activities, in a mining operation at a natural resource or reserve, including a mineral deposit, with the use of disparate, expert technical systems and applications, and the data therefrom, including disparate technical descriptions, annotations, features and properties data, defining spatial geometries and attributes of specific spatial locations in such resource or reserve, the integration of the geometries and attributes at such spatial locations and the tracking over time of changes in the logical status or physical state of the resource or reserve at such locations due to such technical activities and specific, measurable parameters resulting therefrom, at least semi-continuously in a direct, substantially real-time manner during such operation, the method comprising the steps of:
providing a non-transitory computer readable storage medium storing computer-executable instructions, selected from at least one toolset, including technical activity, spatial and accounting rules, and at least one library, with company, technical and accounting codes and practices;
creating, by the computer, a technical work breakdown structure, defining a specific, three-dimensional work place location and specific technical activities to be executed at the specific work place location, representing at least partially in three-dimensional, spatial geometries at a level of detail with preselected granularity in accordance with the planning and timeframe of the operation, wherein the specific work place location corresponds to a specific, three-dimensional spatial location within a natural resource or reserve, including a mineral deposit;
codifying, by the computer, in accordance with the work breakdown structure a corresponding cost code structure of substantially equivalent granularity;
assimilating, by the computer, pre-selected, measurable parameters of the technical activities, including identified resource or reserve modifying factors, to enable the tracking of specific parameters and the impact of the associated activities on the spatial geometries and the attributes of the specific spatial location in the resource or reserve and the change in the state and/or status of the workspace at such location and the associated change in the logical status or physical state of the resource or reserve at such workspace;
generating, by the computer, inventory transactions, reflecting the change in the physical state and logical status of a workspace;
executing, by control of the computer, at least one specific technical activity, including a mining technical activity, at the specific work place location in accordance with the work breakdown structure;
amalgamating the work breakdown structure, the cost code structure, the assimilated preselected, measurable parameters of the at least one mining activity being executed, including the modifying factors, and the inventory transactions into a single integrated spatially-indexed data structure encapsulating all spatial, design, descriptive and quantification attributes related thereto, including technical descriptions, annotations, features and properties defining spatial geometries and attributes, without repopulating all the data contained within the spatially-indexed data structure;
storing, in at least one common, integrated spatially-referenced database, the spatially-indexed data structure, inclusive of at least three-dimensional, technical geometries and attributes of specific at least three-dimensional, spatial locations within the resource or reserve;
translating, by control of the computer, the amalgamated and spatially-indexed work breakdown structure, the cost code structure, the assimilated preselected, measurable parameters of the at least one mining activity being executed, including the modifying factors, and the inventory transactions into attributes of inventory or stock within a resource inventory;
updating, by the computer, the work breakdown structure responsive to an output of the means for generating inventory transactions reflecting the change in the physical state and status of the workspace corresponding to the specific location responsive to the at least one specific technical activity being executed;
comparing, by the computer in communication with an ERP system to enable at least semi-continuous mine planning and control, the use of resources in the at least one mine technical activity and the costs of such use, during such activity at pre-selected detail and granularity; and
analyzing at least some of the spatially-indexed data structure, encapsulating at least some of the spatial, design, descriptive and quantification attributes related thereto, to execute analytic activities selected from the group consisting of technical modeling, of the impact of interaction and observation by at least one technical discipline on the resource or reserve, and analyzing, simulating, optimizing and reporting on the inventory or stock items;

wherein:
the spatially-referenced database is usable by a commercially available inventory management system or application and the translated work breakdown structure, the cost code structure, assimilated preselected, measurable parameters, including the modifying factors, and inventory transactions constitute inventory and stock items and transactions manageable within the ERP system that track over time the change in the logical status or physical state of the resource or reserve at such granular, spatially index level in relation to that location, and the spatially-referenced database and the translated work breakdown structure, the cost code structure, assimilated preselected, measurable parameters, including the modifying factors, and inventory transactions retain the spatially indexed, technical geometries and attributes at such spatial location enabling:
the integration and amalgamation of such data into a single spatially-indexed data structure encapsulating the spatial, design, descriptive and quantification attributes related to the source data, providing a multi-collective, multi-disciplinary technical perspective of a given spatial location in the resource or reserve, and
interoperability between the disparate, mining technical systems and applications, by allowing extraction and reconstitution of such integrated and amalgamated spatial and attribute data from the spatially-referenced database into the file format and structure required by the technical systems and applications, the ERP system and the inventory management system.

10. The method as claimed in claim 9 wherein:
the business activities are mining technical activities, typically executed during life of mine from concept and pre-feasibility assessment to closure in a mining operation for a mineral deposit, and wherein the technical activities comprise mining technical activities and the work breakdown structure is for a specific mining work place location;
wherein the work breakdown structure for the mining work place location and the mining technical activities is created for a specific mining method, based on a mine design template created to reflect a set of mining method specific rules that are founded on mine design considerations and the sequential nature of mining work, to enable the planning of such mining method, with particular outcomes in pre-selected parameters for associated mining technical activities, and the execution thereof to effect a change in the physical state and/or status of the workspace;
wherein the executed activities are selected from a group of mining technical activities comprising ventilating, developing, supporting, mapping, constructing, equipping, inspecting, tramming, hoisting and stockpiling in the workspace;
wherein the mining method specific rules are created, assessed and implemented based on inherent risks characteristic of the specific mining method and operational guidelines of a specific mining company;
wherein the rules for each mining method as reflected within a specific design template are constructed to generate and visualize three-dimensionally, the specific mining technical activities, their geometry and the sequence of such activities, enabling the assimilation of the relevant pre-selected, measurable parameters, including specific metrics such as meters, square meters, cubic meters, tons, mineral grades and mineral content for each mining operation, thereby creating the work breakdown structure for financial integration with the corresponding cost code structure of substantially equivalent granularity; and
including the step of maintaining the granularity equivalency between the mining technical and the cost data at a pre-selected work breakdown structure level of detail according to specific policies and procedures and codes of practice within a particular mining company and through at least semi-continuous master data governance within the mining company.

11. The method as claimed in claim 10 wherein:
the step of creating the work breakdown structure includes the steps of:
creating a programmable, comprehensive, repeatable design template with a non-transitory computer accessible creator, the template:
representing specific mining technical activities, geometry and sequence of activities to be executed; and
dictating a corresponding cost code structure in the ERP system to enable programmable planning and cost control of the use of resources for such activities at corresponding detail and granularity;
thereby accelerating the processes of planning and execution inclusive of relevant and appropriate costing;
wherein the step of codifying the corresponding cost code structure includes the step of codifying, at least semi-continually, the cost code structure, for integration with the ERP system, with a non-transitory computer accessible codifier;
wherein the step of assimilating the measurable parameters includes the step of assimilating, at least semi-continually, data providing specific key performance indicators according to the pre-selected measurable parameters during the execution of mining technical activities, with a non-transitory computer accessible assimilator, thereby enabling the tracking of change in physical state and status over time and, more preferably, determining, classifying and tracking such changes;
wherein the step of generating inventory transactions includes the steps of, at least semi-continually:
receiving the changes in the physical state and status of the mineral deposit being mined;
translating such changes into inventory and stock items that are manageable within an inventory management system; and
generating inventory management system transactions, based on such physical state and/or status changes of the corresponding mineral resources and reserves;
with a non-transitory computer accessible generator; and
wherein the step of comparing the use of resources and the costs of such use includes the step of comparing, in an at least partially-integrated fashion and accordance with the pre-selected policies and procedures and the codes of practice within the particular mining company, and master data governance, mining technical data and cost control data, with a non-transitory computer accessible comparator, during the planning, exercising and costing of mine technical activities, including core and support mining technical activities.

12. The method as claimed in claim 11, further comprising the steps of:
issuing a process works order, as an equivalent to a mining instruction, a survey measuring list, or a short term operational plan of activities;
issuing pro-forma inventory movement transactions, as daily bookings of mining activities;
issuing a purchase order, for purchasing of items, such as required according to a pre-setup bill of materials, and to release the items for production purposes; and
generating updated stock audits, as periodic survey measurements of depletions to ore reserves.

13. A non-transitory computer readable storage medium storing computer-implemented instructions, selected from at least one toolset, with mining technical activity rules, and at least one library, that, when implemented by at least one processor, enables the functionality as provided for with the system as claimed in claim 1.

14. A non-transitory computer readable storage medium storing computer-implemented instructions, selected from at least one toolset, with specific technical activity rules, and at least one library, that, when implemented by at least one processor, perform the method as claimed in claim 9.

15. The system as claimed in claim 4 wherein:
the means for creating the work breakdown structure comprises a non-transitory computer accessible creator, capable of:
creating the programmable, comprehensive, repeatable design templates that represent specific mining technical activities, geometry and sequence of activities;
creating, assessing and implementing the rules with due appreciation of:
the inherent risks characteristic of the specific mining method; and
operational guidelines of the specific mining company;
constructing the rules for each mining method with the specific intent to generate and visualize three-dimensionally:
mining technical activities;
their geometric patterns; and
the sequence of such activities;
enabling the accrual of the relevant metrics for each mining operation, thereby creating the framework for financial integration;
wherein the means for codifying the corresponding cost code structure comprises a non-transitory computer accessible codifier, capable of:
dictating by means of the work breakdown structure a corresponding cost code structure in the ERP system to enable programmable planning and cost control of the use of resources for technical activities; and
controlling the costs in a direct, substantially real-time manner;
wherein the means for assimilating the measurable parameters comprises a non-transitory computer accessible assimilator, capable of:
providing for:
a specific mining method, in the form of a work breakdown structure;
its specific mining technical activities; and
the activities' specific key performance indicators;
collecting and assimilating data continuously during the execution of the mining technical activities to:
determine;
classify; and
track;
the changes in the physical state and status of the mineral deposit being mined;
thereby formalizing the corresponding changes in the physical state and/or status of the mining workspace, upon the execution of the mining technical activities;
wherein the means for generating inventory transactions comprises a non-transitory computer accessible generator, capable of:
changing the physical state and status of the mineral deposit being mined into the inventory and stock items that are manageable within the inventory management system; and
generating the inventory management system transactions, based on the physical state and/or status changes of the corresponding mineral resources and reserves;
wherein the means for comparing the use of resources and the costs of such use comprises a non-transitory computer accessible comparator, capable of:
determining and selecting the equivalency in granularity of the mining technical and the cost data in accordance with the pre-selected policies and procedures and the preselected codes of practice within a particular mining company,
allowing at least semi-continuous master data governance within the mining company, thereby enabling control within the ERP system in an integrated fashion, of the:
planning;
exercising; and
costing;
of the mining technical activities, including core and support mining execution activities; and allowing for:
issuance of the process works order, as an equivalent to a mining instruction, a survey measuring list, or a short term operational plan of activities;
issuance of the pro-forma inventory movement transactions, as daily bookings of mining activities;
issuance of the purchase order, for purchasing of items, such as required according to a pre-setup bill of materials (BOM), and to release the items for production purposes; and
generation of the updated stock audits, as periodic survey measurements of depletions to ore reserves.

* * * * *